United States Patent
Galicia

[11] 3,880,758
[45] Apr. 29, 1975

[54] OIL COLLECTION DEVICE

[76] Inventor: Frank Galicia, 5043 Catherine St., Philadelphia, Pa. 19143

[22] Filed: Apr. 18, 1973

[21] Appl. No.: 352,210

[52] U.S. Cl. .......... 210/187; 210/DIG. 21; 210/83; 210/242; 210/304; 210/512
[51] Int. Cl. .................. B01d 23/20; E02b 15/04
[58] Field of Search ...... 210/83, 242, DIG. 21, 304, 210/512, 187

[56] References Cited
UNITED STATES PATENTS

| | | | |
|---|---|---|---|
| 3,637,080 | 1/1972 | Markel | 210/242 |
| 3,666,099 | 5/1972 | Gallua | 210/242 |
| 3,667,610 | 6/1972 | Daniel | 210/DIG. 21 |
| 3,726,406 | 4/1973 | Damberger | 210/242 |
| 3,734,294 | 5/1973 | Zerbe | 210/242 |

*Primary Examiner*—Theodore A. Granger
*Attorney, Agent, or Firm*—Woodcock, Washburn, Kurtz & Mackiewicz

[57] ABSTRACT

A floatable collection device where contaminated liquid such as water polluted by oil is collected into a central drum by means of an elongated spiralled inverted V-shaped trough which is circumferentially mounted on the drum. The device includes expulsion means by which the contaminated liquid is expelled from the drum to separation apparatus located elsewhere for separation of the oil from the water.

7 Claims, 6 Drawing Figures

OIL COLLECTION DEVICE

CROSS REFERENCE TO CO-PENDING APPLICATIONS

This application is related to applicant's co-pending applications Ser. No. 352,208, filed 4/18/73 entitled "Rotary Oil Recovery Device with Non-Integral Collecting Head" and Ser. No. 352,209, filed 4/18/73 and entitled "Oil Separation and Recovery Device."

BACKGROUND OF INVENTION

The subject invention is designed to be used for collecting oil which may have accumulated on bodies of water as a result of marine accidents and the like. The subject invention is a modification of one of the embodiments disclosed in applicant's U.S. Pat. No. 3,666,099 which issued May 30, 1972. That patent discloses a mechanical rotary oil recovery device which collects the oil polluted water and which also includes a means for separating one from the other. On the other hand, the subject unit functions as a collection device only, although it does include means to expel the oil and water to another facility for separation. This permits a collection means of a less complex design and allows the unit to be operated with a highly efficient separation unit which may be contained on an accompanying craft.

SUMMARY OF THE INVENTION

Accordingly, it is an object of the subject invention to provide an improved floatable rotary device utilizing an inverted V-type of trough for collection and initial separation of a less dense liquid from a more dense one, with the means of expelling said collection to an external means for the final separation step.

It is a further object of the subject invention to provide a floatable rotary oil collection device which because of substantial improvement in design over similar devices, improves the flow characteristics of the contaminated liquid as it is collected.

It is another object of the subject invention to provide a floatable rotary oil collection device which is designed to minimize clogging from timbers or other debris.

It is still a further object of the subject invention to provide a rotary oil collection device with expulsion means integral therewith, the purpose of which is to collect contaminated liquid, namely water contaminated with oil, leaving the final separation to be formed elsewhere.

In accordance with the above objects, the subject invention has been designed to provide an alternative means of collecting oil to earlier rotary oil recovery devices, namely the type disclosed in my U.S. Pat. No. 3,666,099. The rotary oil collection device is rotatably driven by a hydraulic motor or otherwise and comprises generally a collection head and an elongated inverted V-shaped trough or channel which is spiralled about a central drum and which empties contaminated liquid into a centrifugal transfer chamber at the base of the drum. The collection head may be rotated at a speed variable to that of the central drum as shown in co-pending application Ser. No. 352,208 filed 4/18/73 or it may be rotated at the same speed therewith aforementioned U.S. Pat. No. 3,666,099. The oil is drawn to the device by the rotating collection head and is passed into the spiralled inverted V-shaped troughs where it, because of its buoyancy, will rise to the apex of the trough and be forced downwardly by the pressure of following water and oil through an entrance port into the transfer chamber. At this point, as the chamber rotates, the liquid, aided by impellers, will be discharged through an outer circumferential port and conveyed through a duct into a separation tank which may be stored on another craft.

This type of system permits interchangeable separation tanks to be used which will facilitate the servicing and permit the use of multiple pump lines, thus increasing the capacity of the operation.

To expedite the passage of viscous oil in the inverted V-shaped channels, a water supply may be fed to the device and discharged through jets positioned at intervals around the inverted channels. Also, steam may be used to heat the troughs and further expedite the flow of oil.

A fence of vanes may be positioned around a structure and serves several purposes. First, when placed sufficiently close to each other, timber and debris are prevented from clogging the apparatus. Secondly, the fence serves to dissipate the force of heavy waves against the collecting head to improve the fluid mechanics of the device.

DETAILED DESCRIPTION

With reference to the drawings, a rotary oil recovery device is shown in which contaminated liquid, namely oil polluted water, is received by a collection head and channeled along a drum-like member within spiralled inverted V-shaped troughs which are coaxial with the drum-like member. The contaminated liquid enters a chamber at the drum base and is subjected to a centrifugal force from the rotation of the chamber as aided by impellers whereby the liquid is expelled through a circumferential duct to a final separation chamber, not a part of the present invention.

Figure 1:
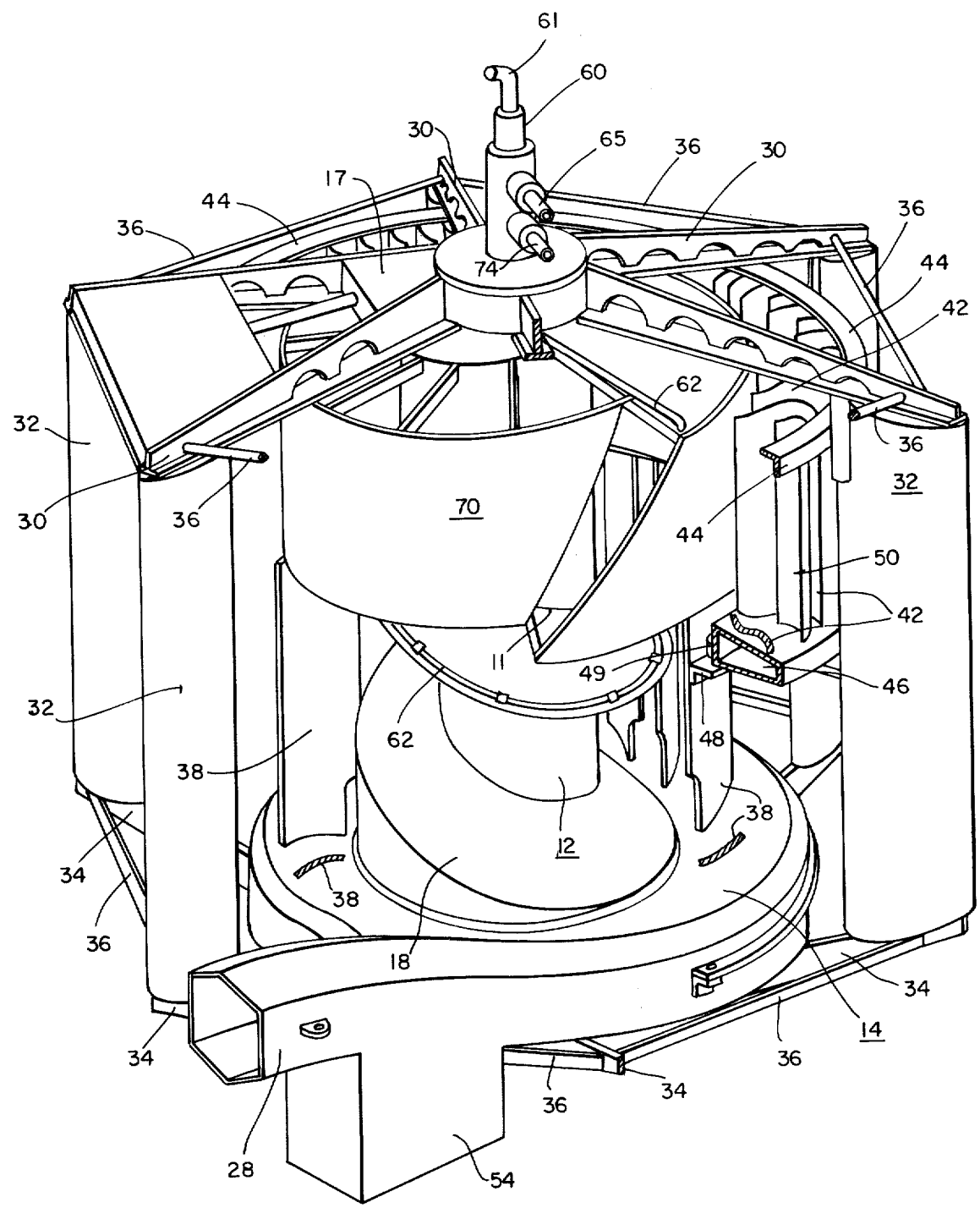
FIG. 1 is an isometric view of the oil collection device.
Figure 2:
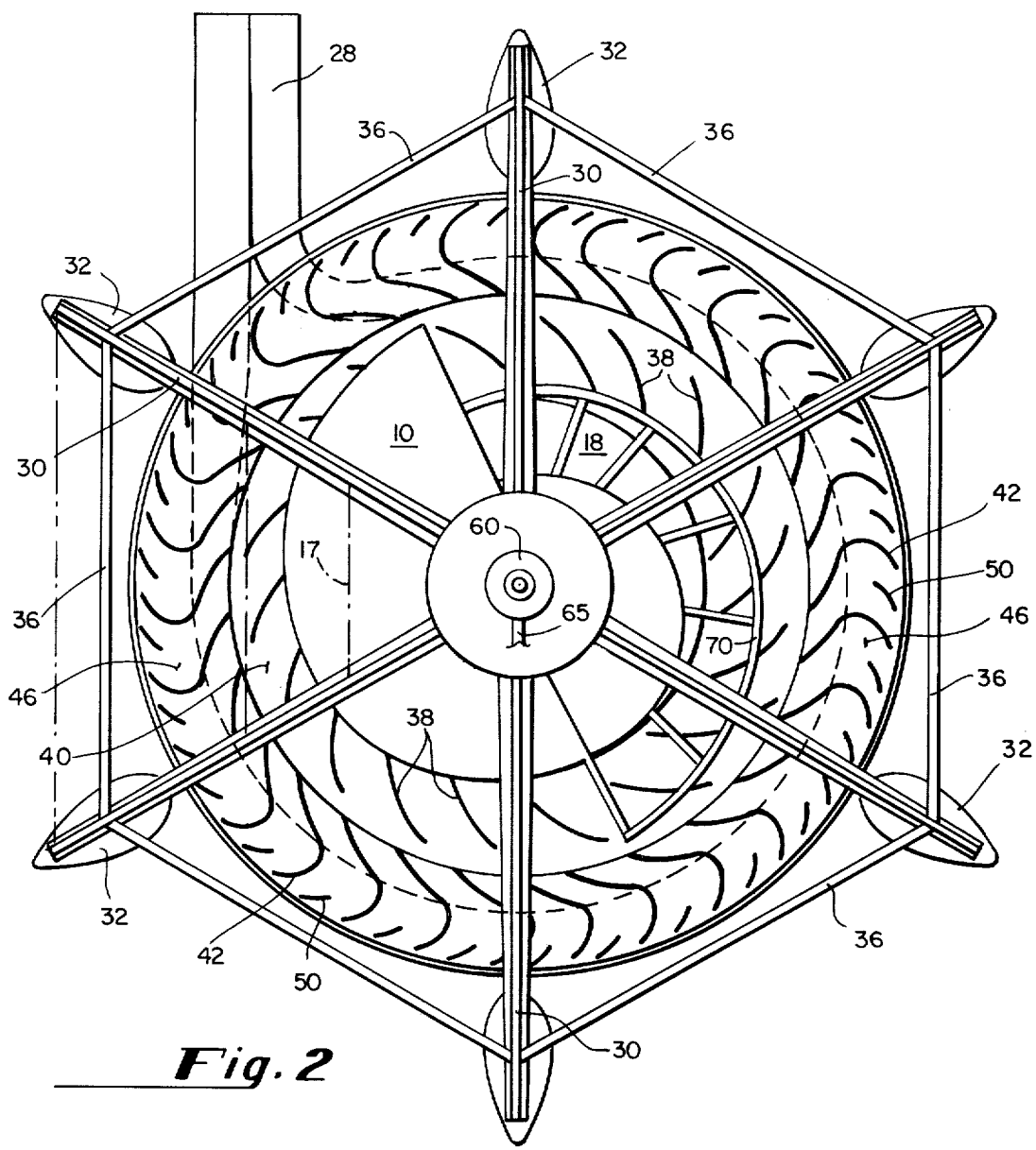
FIG. 2 is a top view of the collection device of FIG. 1.
Figure 3:
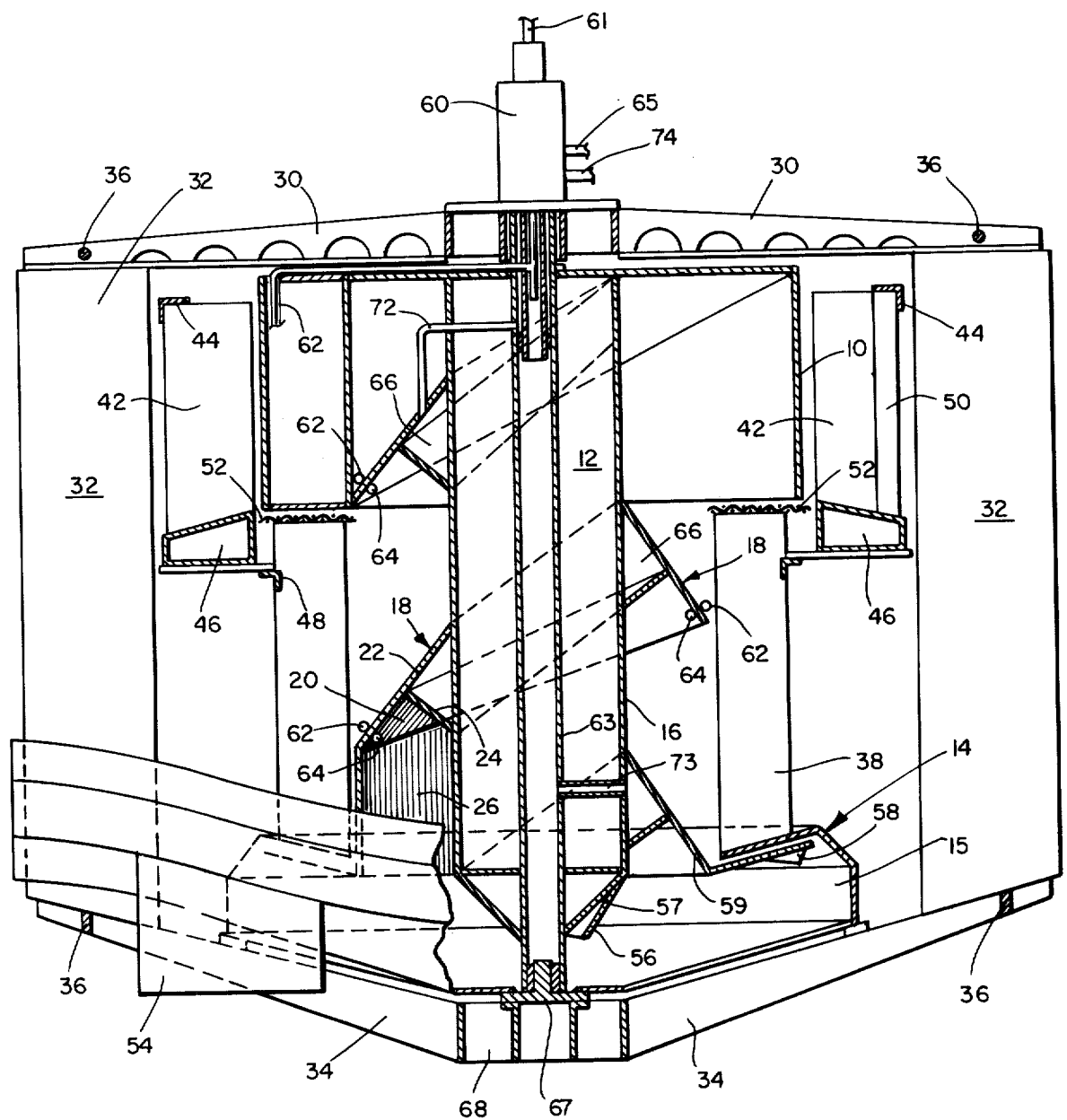
FIG. 3 is a cross-sectional elevational view of the collection device of FIG. 1 taken through the center of the device with the outlet duct shown in full.

As can best be seen from FIGS. 1-3, the collection device comprises a collection head shown generally as 10, a screw or rotor portion shown generally as 12, a centrifugal expulsion unit shown generally as 14, and support and buoyancy structure all of which will be described in detail.

The collection head 10 as shown is generally similar to that shown in my aforementioned U.S. Pat. No. 3,666,099 and may have one or two collection scoop openings 11. In U.S. Pat. No. 3,666,099, the collection head is integral with the rotor member and therefore must rotate at the same speed. The collection head may also be of the design as shown in my co-pending application Ser. No. 352,208 filed 4/18/73. In that application, the collection head is not integral with the rotor member and may be operated at a variable speed as determined by fluid mechanics, weather and sea conditions, type of oil, and by considerations of the size and volume of intake.

The screw or rotor 12 comprises a hollow air tight cylinder 16 and a spiralling inverted V-shaped channel or trough 18 which is coaxial with the drum and is rigidly secured thereto. The rotor 12 is driven by a hydraulic motor or otherwise which may be housed in compartment 17 and effectively counterbalanced by weight on the opposite side of the device. As in the case of collection head 10, the inverted V-shaped channeling 18 may be as disclosed in my aforementioned U.S. Pat. No. 3,666,099 but preferably it is to be as designed in my co-pending application Ser. No. 352,208 filed 4/18/73 and as shown in FIG. 3. The channel 18 is comprised of two bands, a wide outer band 22 which extends angularly downwardly intersecting, at its upper edge, the wall of the drum 16. The narrow inner band 24 extends angularly upwardly intersecting, at its lower edge, the wall of drum 16 and intersecting, at its upper edge, the approximate middle portion of band 22. The inverted V-shaped angle 20 is, as can be seen from a comparison with the inverted V-shaped portion of U.S. Pat. No. 3,666,099, wider and debris is less likely to become wedged in the angle and cause clogging. The inverted V-shaped channel 18 begins at the collection head 10, runs spirally down the drum 16, and terminates at port 26 where the contaminated water enters the centrifugal unit 14. A chamber 15 is housed within the unit 14 where the oil and water collect. Communicating therewith is a duct 28 which leads from the circumference of the chamber 15 as shown in FIG. 1 to containment and separation means which is located apart from the collection device. An additional buoyancy tank 54 is shown at the base of the outlet duct 28.

The overall physical structure of the collection device is similar to that described for the rotary oil recovery device as described in my co-pending application Ser. No. 352,208 filed 4/18/73. Upper spoke members 30 extend radially outwardly and are used to secure buoyancy tanks 32 thereto. Similar spokes 34 extend outwardly at the base of the unit and are likewise secured to the buoyancy tanks 32. Frame members 36 extend laterally between each of the buoyancy tanks at top and bottom and are connected to spokes 30 and 34 respectively to increase the stability of the structure.

Encircling the screw and rotor 12 and extending from the top 40 of the outside of the expulsion chamber unit 14 to the base of collection head 10 is a cagelike structure comprising a plurality of outwardly curved vanes 38 angularly positioned inwardly in the rotative direction of the rotor 12. Affixed to the tops of the vanes 38 is a circular grill or screen 52.

Encircling the collection head 10 is a fence-like structure comprised of sharply curved somewhat sickle shaped vanes 42 (alternately interposed by narrow slightly curved vanes 50) affixed at their bases to a circular trapezoidal sectioned pontoon 46 which is supported by frame member 48. Frame member 44 secures the vanes 42 and 50 at their tops.

The expulsion unit shown generally as 14 has two impellers located within chamber 15. The main impeller 56 is formed at or secured to the base of the hollow drum 16 by means of support 57 and rotates therewith. A secondary impeller 58 comprising a flap-like protrusion is shown extending from flange support 59 at the base of the outer band 22 of the trough structure 18.

A sliding rotary valve element (water and steam) 60 communicates with a water pressure supply by means of water line 61 and water under pressure is fed through tube 62 to be ejected counter-rotatably toward the vertex of the channels 18 through jets 64. Also, a steam line 65 with return line 74 feeds through rotary valve element 60 and supplies a source of steam through pipe 72 to steam channels 66 which are enclosed triangular channels between drum wall 16 and troughs 18. The spent steam returns from channels 66, through pipe 73 into central shaft 63 and through valve 60 to return line 74 for reheating and recirculation. Plug 67 seals off the base of shaft 63 as its vertical portion is encased by a radial bearing which permits the shaft to rotate. It also serves as a bearing plate on the central base structure 68 upon which the base of the non-rotating expulsion unit 14 rests.

The collection head 10 may have one or two scoops 11 depending on the structure of the troughs 18 as discussed in aforementioned U.S. Pat. No. 3,666,099 and co-pending application Ser. No. 352,208 filed 4/18/73. If one scoop, then counterbalancing structure 70 as shown in FIGS. 1 and 2 may be added.

Figure 4:
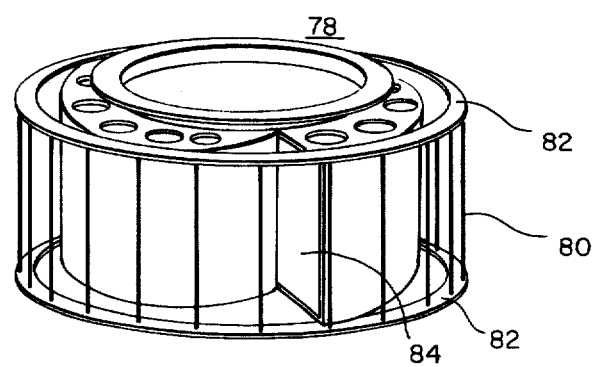
FIG. 4 shows an alternate embodiment of the collection head as shown in FIG. 1 and the preceeding Figures.

In an alternate embodiment, (see FIG. 4) the fence-like structure which surrounds the collection head 78 may comprise a plurality of rods or wires 80 which are shown encircling collection head 78 and which extend vertically at intervals between the upper and lower ramps 82 of the structure to protect scoop 84 from debris.

In operation, as the collection head 10 and rotor 12 rotate, water is drawn into the collection head as it passes through the sickle shaped vanes 42 and interposed curved vanes 50. The configuration, spacing and arrangement of these vanes permits the relatively free passage of oil polluted water into the collection head but prevents the entrance of debris of such a size that would impair the mechanical functioning of the device. These vanes also serve to counter and dissipate the force of heavy winds and waves against the collecting head as it rotates. A grill or screen 52 extends around the top portion of the lower vanes 38 to further prevent the passage of debris. The screen 52 also acts to dampen the force of waves and prevents an upwardly suction effect on water toward the head 10.

Once the contaminated water has been drawn within the collection head, it is forced downwardly within the spiralling troughs 18 by the pressure of the following water, the less dense buoyant oil thereupon rising to the apex of the inverted V-shaped trough 18. Meanwhile the rotation of the rotor 12 within the encircling vanes 38 creates a suction which counteracts the centrifugal force simultaneously generated by said rotation and thus confines the oil to within the inverted V-shaped troughs 18 as it is conveyed downwardly through the port 26 and into the expulsion chamber 15. Once in the expulsion chamber 15, the impellers 56 and 58 by their rotation within the non-rotating chamber create a centrifugal pump type of action and the contaminated water is ejected through the duct 28 to a tank or separation craft where containment and separation means are located.

The inverted V-shaped troughs 18 which form the vertex angle 20 have, as described in my co-pending application Ser. No. 352,208 filed 4/18/73 a wide angle to prevent clogging. Also, water pumped to the device by means of rotary valve 60 and ejected counter-rotatably toward the vertex of the troughs 18 through jets 64, serves to expedite the passage of viscous oil through the inverted V-channels and provides a more efficient operation. Further steam if supplied to channels 66, serves to heat very viscous oil to increase its fluidness.

Figure 5:
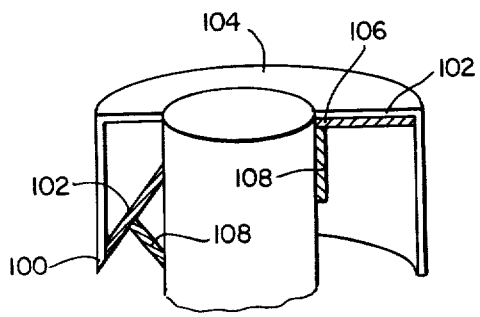
FIG. 5 is a partial elevational view of a modified trough top.
Figure 6:
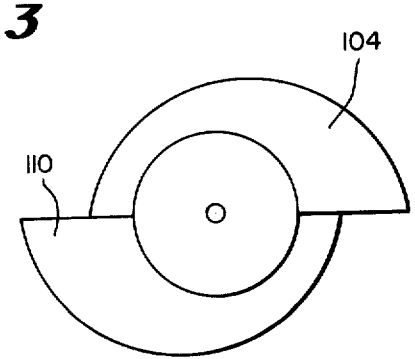
FIG. 6 is a top view of the trough top of FIG. 5.

A slightly modified variation of the troughs can be seen in FIG. 5. At point 100 where outer edge of trough member 102 and the base of top plate 104 intersect, outer side of trough 102 gradually widens and increases in axial angularity as it spirals upwardly and intersects top plate 104 terminating in a right angle at radius point 106 at the front edge of plate 104. Inner side or band 108 simultaneously decreases in axial angularity forming an interface with drum surface at radius point 106. A corresponding plate 110 diametrically opposite to plate 104 (see FIG. 6) serves as a counterbalancing means.

While various embodiments of the invention have been shown and described, it will be understood that various modifications may be made. The appended claims are, therefore, intended to define the true scope of the invention.

I claim:

1. A liquid collection device comprising:
   a rotatable cylindrical member disposed within said collection device,
   an inverted trough supported by and disposed in a spiral fashion around the perimeter of said cylindrical member,
   liquid collection means rotatably connected to the upper portion of said cylindrical member to direct collected liquid to said inverted trough,
   and a circular expulsion chamber located at the base of said collection device cooperatively associated with said inverted trough to receive the liquid flowing from said trough and to direct said liquid through a duct communicating with said chamber to containment means located apart from said collection device.

2. The liquid collection device of claim 1 wherein said expulsion chamber includes rotatable propeller means for ejecting said liquid through said duct.

3. The liquid collection device of claim 1 wherein said trough includes water ejection means disposed at spaced intervals at the periphery of said trough for counterrotatably ejecting water toward the vertex of said trough, said water ejection means communicating with a spiral shaped fluid conduit means supported by said trough.

4. The liquid collection device of claim 1 including a plurality of outwardly curved encircling vanes disposed around said inverted trough, said encircling vanes forming a cage-like structure which confines said liquid within said inverted trough.

5. The liquid collection device of claim 1 including curved vane means constructed and arranged to permit passage of said liquid but to exclude passage of debris into said collection means.

6. The liquid collection device of claim 1 including means disposed in heat exchange relationship with said inverted trough for heating said liquid flowing in said trough to increase the fluidity of said liquid.

7. The liquid collection device of claim 6 in which said heating means comprise spiral fluid conduit means contiguous to said inverted trough.

* * * * *